Patented Mar. 17, 1931

1,796,656

UNITED STATES PATENT OFFICE

RUDOLPH KRECH, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF VULCANIZED COLORED RUBBER

No Drawing. Original application filed September 3, 1927, Serial No. 217,528, and in Germany September 4, 1926. Divided and this application filed September 12, 1929. Serial No. 392,254.

The present invention relates to the production of colored rubber goods.

The production of clear violet, blue and green dyeings on rubber has hitherto been difficult. The basic and acid dyestuffs of the triarylmethane series and the antraquinone series, which on account of their brillancy particularly come into question here, are inapplicable because both the soluble dyestuffs and the lakes produced from them are destroyed in the vulcanizing operation.

I have now found that insoluble metal salts of acid anthraquinone dyestuffs containing at least one amino group in the broad sense i. e. a free or substituted amino group, and which, according to the definition given above, contain sulphonic or carboxylic radicles, which salts may, if desired, be formed on a suitable substratum, constitute exceptions to the general inapplicability of dyestuffs of these kinds and produce dyeings on rubber which are fast to vulcanization.

The following example will further illustrate how this invention may be carried out in practice, though it is understood that the invention is not limited thereto. The parts are by weight.

Example 90 parts of a rubber mixture containing in 100 parts 74 parts of light colored crude rubber, 2.5 parts of sulphur, 2.2 parts of an accelerator, 13 parts of zinc white and 8.3 parts of lithopone, are mixed with 10 parts of a color lake made as follows: 15 parts of sodium 1-amino-4-phenylamino-anthraquinone-2-sulphonate, which may be obtained by condensing 1-amino-4-bromo-anthraquinone-2-sulphonic acid and p-toluidine according to U. S. Patent No. 1,131,516, are dissolved in 300 parts of water at the ordinary temperature, the solution is heated and then precipitated by adding 35 parts of a solution of barium chloride of 10 per cent strength. The precipitate is filtered, washed, dried at 50° C. and powdered. The blue color withstands vulcanization when the mixture is worked up on the hot mixing rollers and the thin rolled sheet are embedded in talc and treated with steam at 3 atmospheres pressure for 70 minutes.

Another suitable metal salt of the dyestuff, particularly calcium salt, may be substituted for the barium salt in this example.

As further examples of suitable dyestuffs may be named alizarine direct violet R (Shultz, Farbstofftabellen, 6th edition, 1923, No. 852 Colour Index No. 1074), alizarine cynanine green G (Schultz, No. 865 equal to alizarine brilliant green G Colour Index No. 1079) 1-amino-4-para-acetylaminophe-nylamino-anthraquinone-2-sulphonic acid (U. S. Patent No. 1,131,516).

This application has been divided out from my copending application Ser. No. 217,528, filed September 3rd, 1927.

What I claim is:

1. The process of producing vulcanized colored rubber goods, which comprises incorporating with the rubber prior to vulcanization, an insoluble metal salt of an acid anthraquinone dyestuff containing at least one amino group and then vulcanizing the rubber.

2. As new articles of manufacture vulcanized colored rubber goods comprising an insoluble metal salt of an acid anthraquinone dyestuff containing at least one amino group.

3. As new articles of manufacture vulcanized colored rubber goods comprising an insoluble barium salt of 1-amino-4-phenyl-aminoanthraquinone-2-sulphonic acid.

In testimony whereof I affix my signature.

RUDOLPH KRECH.